July 25, 1961   J. I. DAVIS ET AL   2,993,549
GROUND POWER SYSTEM FOR JET TYPE AIRCRAFT
Filed May 11, 1959   11 Sheets-Sheet 1

INVENTORS
Jerome I. Davis
Raymond J. Enyeart
BY John E. Steinback
Krasinski + Nolan
ATTORNEYS July 25, 1961 J. I. DAVIS ET AL 2,993,549
GROUND POWER SYSTEM FOR JET TYPE AIRCRAFT
Filed May 11, 1959 11 Sheets-Sheet 2

INVENTORS
Jerome I. Davis
Raymond J. Enyeart
BY John E. Steinback
Kraszewski + Nolan
ATTORNEYS

July 25, 1961   J. I. DAVIS ET AL   2,993,549
GROUND POWER SYSTEM FOR JET TYPE AIRCRAFT
Filed May 11, 1959   11 Sheets-Sheet 5

INVENTORS
Jerome I. Davis
Raymond J. Enyeart
BY John E. Steinback
Krazuiski + Nolan
ATTORNEYS July 25, 1961    J. I. DAVIS ET AL    2,993,549
GROUND POWER SYSTEM FOR JET TYPE AIRCRAFT
Filed May 11, 1959    11 Sheets-Sheet 8

INVENTORS
Jerome I. Davis
Raymond J. Enyeart
BY John E. Steinback
Krazinski & Nolan
ATTORNEYS

Fig. 18

INVENTORS,
Jerome I. Davis
Raymond J. Enyeart
BY John E. Steinback
Krasinski + Nolan
ATTORNEYS

Fig. 19

2,993,549
Patented July 25, 1961

1

2,993,549
GROUND POWER SYSTEM FOR JET TYPE AIRCRAFT
Jerome I. Davis, Bedford, N.Y., and John E. Steinback, Stamford, and Raymond J. Enyeart, Westport, Conn., assignors to Consolidated Diesel Electric Corporation, Stamford, Conn., a corporation of New York
Filed May 11, 1959, Ser. No. 812,261
17 Claims. (Cl. 180—14)

The present invention relates to apparatus for moving jet-propelled aircraft and, more particularly, to a system for such aircraft of the type now being built for commercial airlines, which system powers the wheels of the aircraft while on the ground and which system also can supply hydraulic, pneumatic and electric power to the aircraft.

In the operation of commercial flights, the outgoing aircraft is taxied from a hangar or a parking area to a passenger loading gate and then to a runway for takeoff, and the incoming aircraft is taxied from the runway to the passenger unloading gate. However, this manner of ground operation is not possible with commercial jet type aircraft because the noise, blast, heat and fumes of jet engines cannot be tolerated in the vicinity of the passenger loading and unloading area. Also, there are the problems of engine ingestion of foreign particles in such area and high fuel consumption of jet engines during ground operations.

The most logical solution is to move the aircraft about the airport while the engine is shut down by means of another source of power. The methods which have been suggested are (1) a tractor for towing the aircraft, (2) a "cable-car" towing system, (3) tire-on-tire turners, (4) partial lift tractors that improve their traction by transferring some of the weight of the aircraft to tires or tracks of the tractor, (5) motors on the wheels powered by an auxiliary system carried by the aircraft, and (6) wheel movers adapted to be coupled and uncoupled.

Before considering the relative merits of these methods, it should be understood that the basic demands placed on a ground movement power unit are that it will propel 250,000 pound aircraft at a speed up to five miles per hour with acceleration on the order of one foot per second. The unit should be designed to move the aircraft so as to successfully negotiate a two percent grade without a serious loss in forward velocity, and must move the aircraft on snow-covered ramps when the coefficient of friction between the aircraft tires and the ramps is as low as 0.2.

Accordingly, an object of the present invention is to provide a system for moving aircraft of the type previously indicated by wheel movers adapted to be coupled and uncoupled.

Another object is to provide such wheel movers which do not impose any material weight penalty to the aircraft.

Another object is to provide such wheel movers which are so light in weight that they can be handled manually, and can be rapidly coupled and uncoupled.

Another object is to provide such wheel movers which can be fitted on any aircraft with little or no modification of the aircraft.

Another object is to provide such wheel movers which afford the required power for movement even under poor ramp surface conditions caused by rain, snow or ice.

Another object is to provide such a system which includes a power plant mounted on a relatively small mobile vehicle.

Another object is to provide such a system wherein the power plant supplies hydraulic power to the wheel movers and hydraulic, pneumatic and electrical power to the aircraft.

2

Another object is to provide such a system which can be under the complete control of the pilot or a ground walker who is in continual contact by radio with the control tower and the ground crew handling the vehicle.

A further object is to make the aircraft as mobile as aircraft which can be taxied, and to make possible starts, stops and turns, even in heavy snow.

A still further object is to enable the aircraft to be nosed into close quarters.

Other and further objects will be obvious upon an understanding of the illustrative embodiment about to be decribed, or will be indicated in the appended claims, and various advantages not referred to herein will occur to one skilled in the art upon employment of the invention in practice.

*General description*

Figure 1:
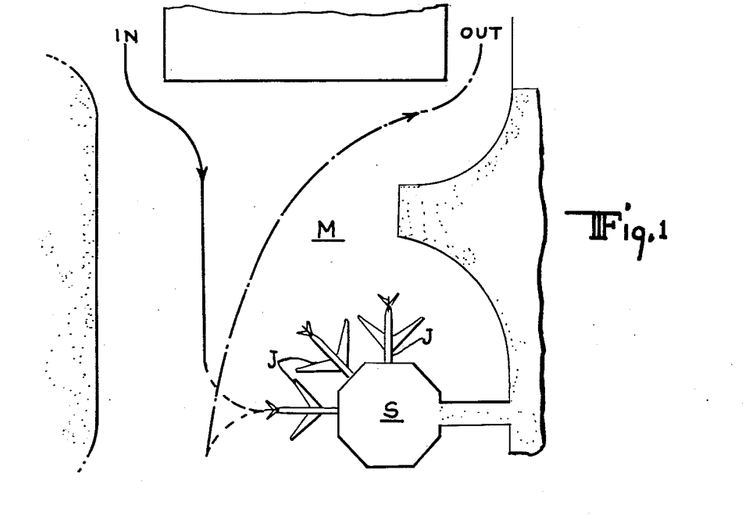
FIG. 1 is a schematic view of the platform area of an airport illustrating the path the aircraft must be moved in this area.

Referring to the drawings in detail, the platform or loading area of an airport is shown in FIG. 1 which includes an entrance marked "In" and an exit marked "Out," a station S where the gates are located, jet aircraft J in loading and unloading position at the station, and a maneuvering area M between the station and the entrance and the exit.

The path of the aircraft is shown in broken lines. On its way to the station, the aircraft is moved forward and negotiates several turns; and on its way from the station, the aircraft is backed out, turned and moved forward to the exit. The wheel moving system in accordance with the present invention, about to be described in detail, is particularly adapted to move the aircraft in this manner and to execute even more complicated maneuvers if called upon.

Figure 2:
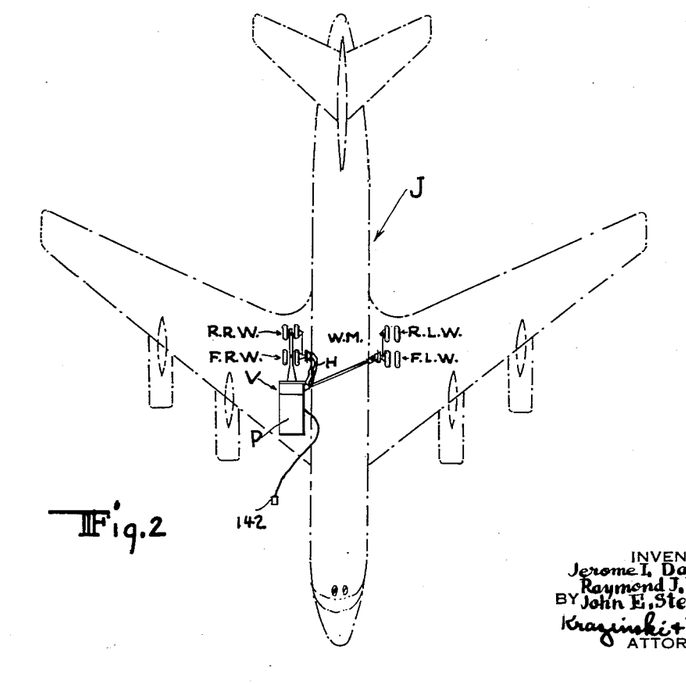
FIG. 2 is a schematic view of jet powered aircraft and thes wheel movers and the power system.
Figure 16:
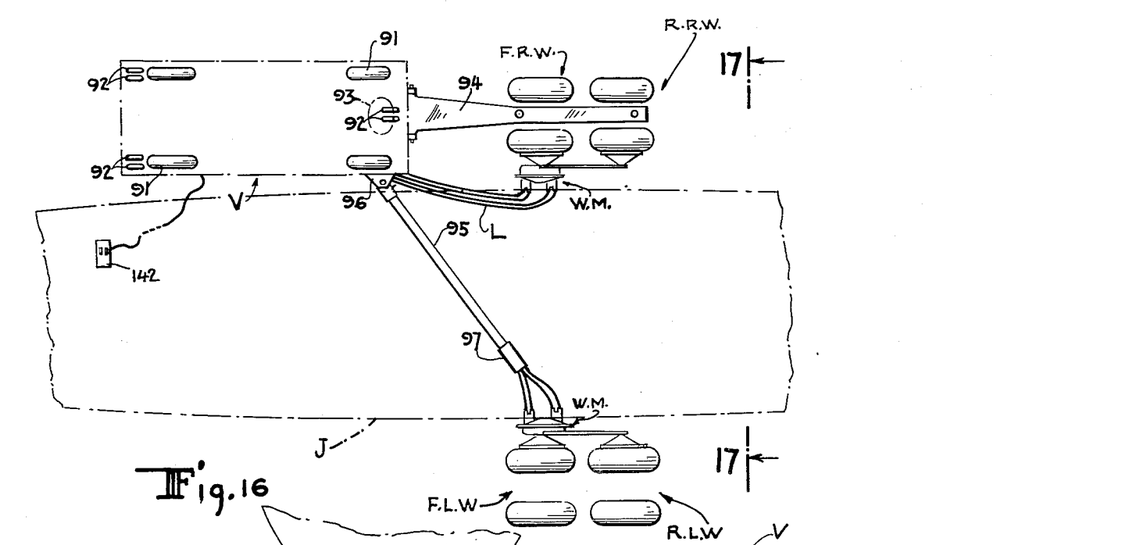
FIG. 16 is a top view of the system in accordance with the present invention illustrating the vehicle, the power plant and the wheel movers attached to the wheels of the aircraft, with the outline of the vehicle shown in phantom.
Figure 17:
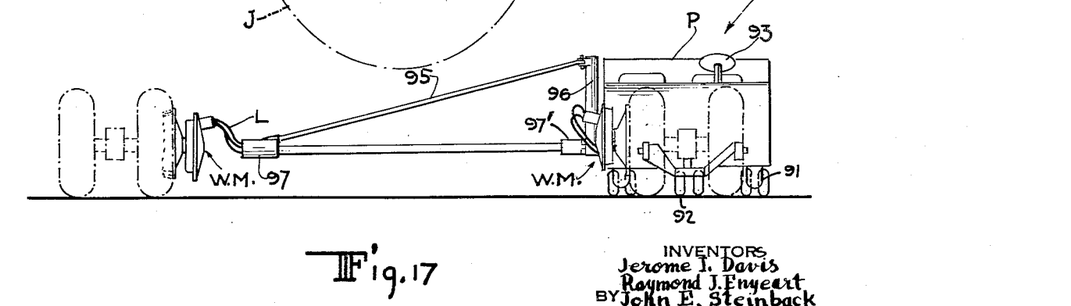
FIG. 17 is a front view of the vehicle.

In FIG. 2, a jet aircraft is shown having main landing gear which includes pairs of front and rear wheels respectively at the right and the left of the fuselage, indicated as FRW, RRW, FLW and RLW. The power supply P, mounted on a vehicle V, as shown in this view and in FIGS. 16 and 17, is equipped with a pair of wheel movers WM adapted to be coupled to the inner wheels at the right and the left to drive the aircraft while on the ground. In order to accomplish this, these aircraft wheels are provided with means for placing the wheel movers in driving connection therewith.

Preferably, the wheel movers WM are driven by hydraulic motors which are supplied with hydraulic power by hoses H connected to the power supply P. The motors are reversible and are independently controllable, and a remote control box 142 containing the control levers can be located in the aircraft cockpit or in the hands of an operator walking alongside of the aircraft for controlling the motors.

The wheel movers in general

A wheel mover WM is shown in FIGS. 3 to 15, and generally comprises a first section adapted for attachment to an aircraft wheel to be driven, a second section structurally connected to the first section and adapted for attachment to an aircraft wheel in line with the wheel to be driven to thereby provide a torque reaction point connection, a pair of motors and a gear train including a gear or serrated ring adapted to mesh with a gear or serrated ring on the aircraft wheel to be driven, an arrangement in the gear train to put the drive ring and the driven ring in mesh, and clamping mechanism for coupling the wheel mover sections to the aircraft wheels and for uncoupling the same.

The aircraft wheel and wheel mover structure

Figure 4:
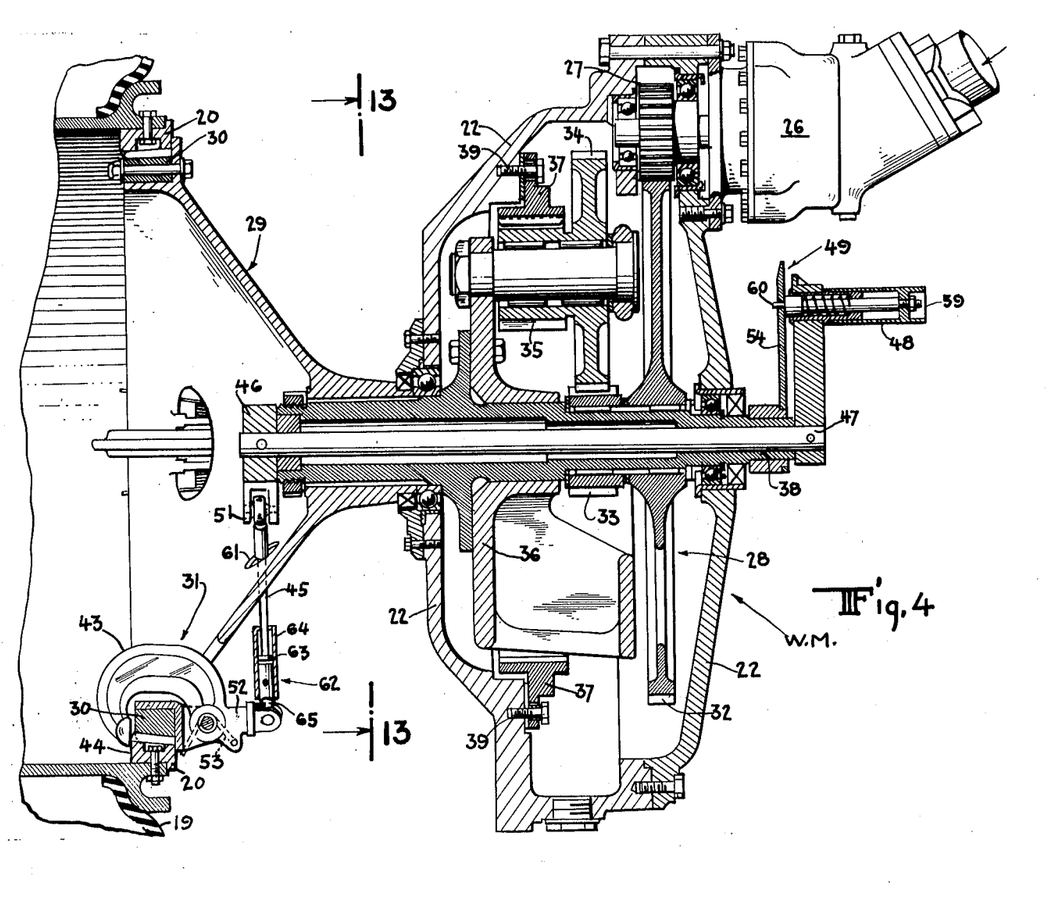
FIG. 4 is an enlarged sectional view taken along the line 4—4 on FIG. 3.
Figures 5, 6, 7:
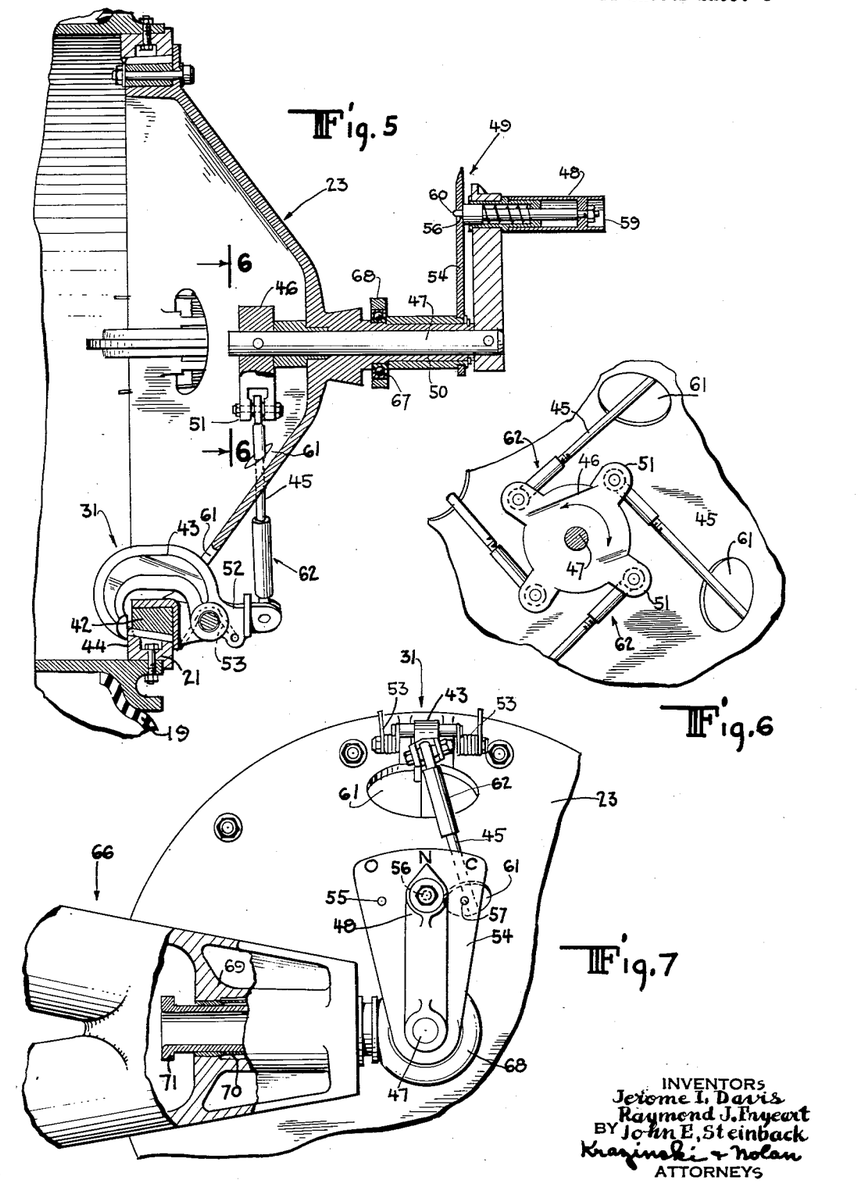
FIG. 5 is an enlarged sectional view taken along the line 5—5 on FIG. 3.
FIG. 6 is a sectional view taken along the line 6—6 on FIG. 5.
FIG. 7 is an enlarged fragmentary side view, with parts broken away of the portion of the wheel mover shown at the right in FIG. 3 and in section in FIG. 5.

As shown in FIG. 4, the aircraft wheel 19 to be driven is provided with a recessed serrated ring 20 on its face having radially inwardly facing teeth adapted to receive the teeth of the driving serrated ring of the wheel mover and the clamping mechanism, and the aircraft wheel in line with the driven wheel is provided with a similar ring 21 (FIG. 5) adapted to receive an idling ring and the clamping mechanism for establishing the torque reaction point. The rings, two of each being required, are relatively light in weight and, together with the control equipment on the aircraft, represent the only additional weight imposed by the present system. Such weight is tolerable in view of the other advantages gained. Also, these elements represent the only changes which must be made in the design of the aircraft wheels and these changes are of a minor nature and are feasible in connection with conventional wheel structure for large aircraft.

Figure 3:
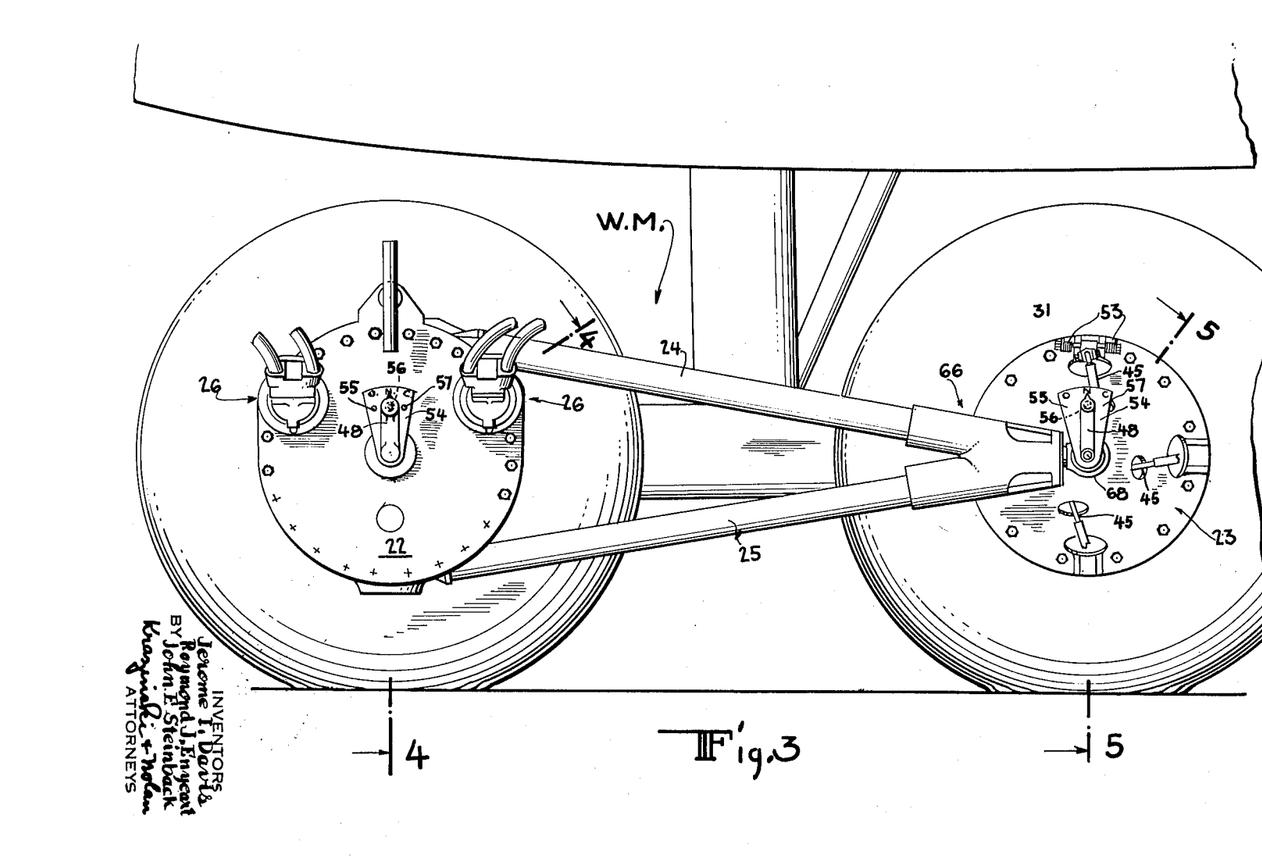
FIG. 3 is a side view of a wheel mover attached to a set of wheels of the aircraft.

As shown in FIGS. 3 and 4, the wheel mover, as already indicated, comprises a section or casing 22 for the aircraft wheel to be driven, a torque reaction element 23 for the torque reaction point, an aircraft wheel in this instance, and a V-shaped arm including a pair of struts 24 and 25 connecting the casing 22 to the torque reaction element 23 in the manner described hereinafter.

The wheel mover drive

The details of the wheel mover drive are shown in FIGS. 3, 4, 8, 9 and 10. Generally described, the drive comprises two reversible hydraulic motors 26 mounted on the casing 22 with each motor having a main drive gear 27; a gear train 28 in the casing 22; and a driving element 29 driven by the gear train. The driving element 29 carries a serrated ring 30 adapted to mesh with the aircraft wheel ring 20 and wheel clamping mechanism 31 (FIGS. 3 and 4). Preferably, the aircraft wheel ring 20 is flared and the driving ring 30 tapered to facilitate mesh engagement of these rings upon insertion of the male ring 30 into the female ring 20.

Figure 8:
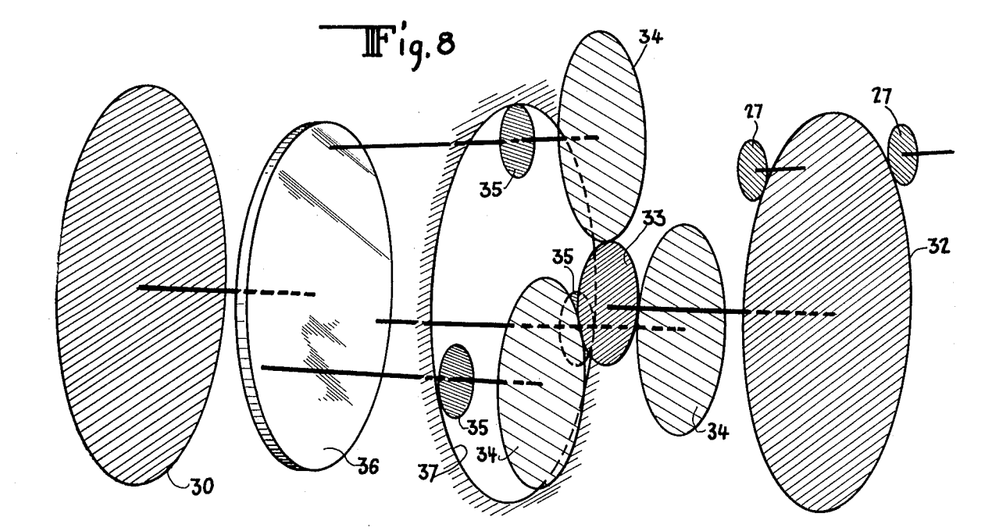
FIG. 8 is a schematic perspective view of the gear train shown in FIG. 4.

As best shown in FIGS. 4 and 8, the gear train 28 comprises a gear 32, which is driven by the motor gears 27 and carries a reducing sun gear 33, and three sets each of planet gears 34 and 35 mounted on a planet carrier 36 connected to rotate the driving element 29, with the planet gears 34 in mesh engagement with the sun gear 33 and the planet gears 35 in mesh engagement with a ring gear 37 mounted within the casing 22, as described hereinafter.

In order to mount the gears 32, 33 and the planet carrier 36, a central sleeve or drive shaft 38 extends through and is journalled for rotation in the casing 22 (FIG. 4). The gears 32 and 33 are freely rotatable on the drive shaft 38, whereas the planet carrier 36 is rigidly secured to the drive shaft 38 to effect rotation thereof and the driving element 29 is likewise rigidly secured to the drive shaft 38 to be rotated thereby.

Figure 9:
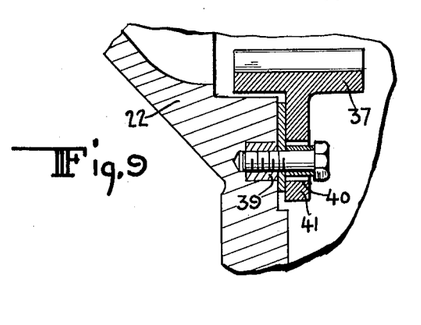
FIG. 9 is an enlarged fragmentary sectional view of a floating gear connection shown in FIG. 4.
Figure 10:
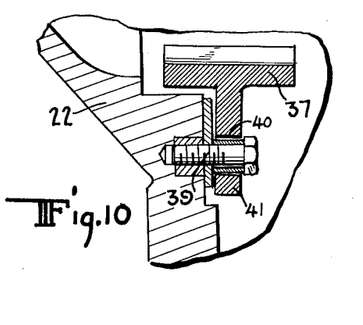
FIG. 10 is a view similar to FIG. 9 illustrating the manner in which the gear can move.
Figure 11:
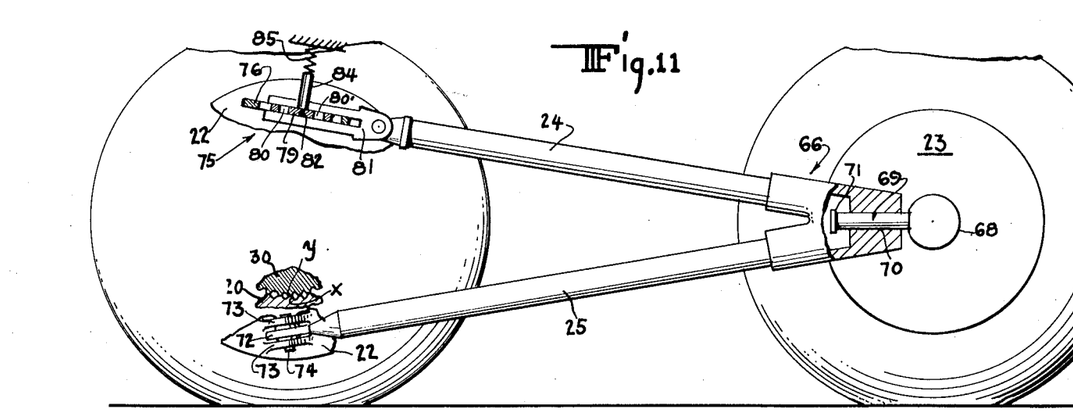
FIGS. 11 and 12 are side views, partly in section, of an arrangement for coupling the wheel mover in driving connection with a wheel of the aircraft.

The ring gear 37 is in floating connection with the casing 22 to provide tolerances in all directions for variations in concentricity and alignment. This floating connection is shown by bolts 39 which extend through oversize holes 40 in flange 41 on the ring gear 37 and which are threaded into the casing 22 (FIGS. 4, 9 and 10).

The wheel clamping mechanism

The elements 23 and 29 are similar in construction, except that the torque reaction element 23 idles with an aircraft wheel, whereas the element 29 drives an aircraft wheel, and each element is provided with substantially identical clamping mechanisms 31. The torque reaction element 23 similarly carries a tapered ring 42 (FIG. 5) which is adapted to be inserted into the flared opening provided by the recessed ring 21.

As best shown in FIGS. 4 to 7, the clamping mechanism comprises several independently spring-biased C-clamp members 43 for engaging the inner edge 44 of the rings 20 and 21 of the respective aircraft wheels, links 45 for rocking the C-clamp members 43, a plate 46 for moving the links 45, a centrally mounted shaft 47 for rotating the plate 46, a handle 48 rigidly connected to the shaft 47 for rotating the shaft 47, and an arrangement 49 for locking the handle 48 in one of three positions, namely, Open (O), Neutral (N) and Close (C). In the drawings the handle is shown in the Neutral (N) position.

More specifically, the shafts 47 are journalled in the hollow drive shaft 38 (in casing 22) and in a sleeve 50 (part of torque reaction element 23), respectively; the plates 46 are provided with lugs 51 for connecting the links 45 thereto; and the C-clamp members 43 are each provided with a lever section 52 to which the links 45 are connected. A pair of suitable springs 53 is operatively connected to each of the clamp members 43 to normally urge the same into their ring engaging position. The shaft locking arrangement 49 includes a plate 54, secured to the element 29 through the drive shaft 38 or directly to the element 23, which plates have three index apertures 55, 56 and 57 for determining the three positions (O), (N), and (C), respectively, of the clamp members. A spring urged retractable grip 59 on the handle 48 has a pin 60 adapted to enter the index apertures. The elements have suitable openings 61 to accommodate the clamp members and the links.

Referring again to FIG. 4, link 45 is shown slidably terminated in locking member 62, coupled to the lever 52, which member 62 includes a piston 63, rigidly secured to an end of the link 45 and slidable within a cylinder 64 that is fixedly secured to a pivotally mounted arm 65 of the lever 52. The inner end of the arm 65 within the cylinder 64 is enlarged to offer an abutment to the piston 63, when the C-clamp member 43 is to be released to the Open (O) position.

As mentioned heretofore, each C-clamp member 43 is in the neutral position, so that the piston 63 is shown in FIG. 4 adjacent the enlarged portion of arm 65. In the Close (C) position of the handle 48 the piston 63 will be drawn upwardly, as viewed in FIG. 4, in abutting engagement with upper, inner face of the cylinder 64, so that the locking member 62 and, in turn the C-clamp member 43 is held fixed in the position shown. Obviously, the locking member 62 including arm 65 cannot move downwardly, as viewed in FIG. 4, in view of the resistance offered by piston 63 to the cylinder 64.

When the handle 48 is moved to the Open (O) position, the link 45 and the piston 63 are moved downwardly as viewed in FIG. 4, piston 63 passing beyond the position shown in FIG. 4 and engaging the enlarged portion of arm 65 to rotate the lever 52 in a clockwise direction, as viewed in FIG. 4, and thereby disengage the C-clamp 43 from the ring 30. From the foregoing description of locking member 62 it will be readily apparent that the action of the C-clamp member 43 is analogous to that of a conventional door latch having a bolt that yields to pressure in closing and then springs into the keeper in the door jam.

*The torque reaction element connection*

In FIGS. 3, 5, 7 and 11 to 14, an arrangement is shown for connecting the casing 22 and element 23 to provide a torque reaction point for the wheel mover and to permit adjustment of the wheel mover to facilitate meshing of the rings 20 and 30.

To accomplish this the converging ends of the struts 24 and 25 are secured to a V-shaped fitting 66 which is slidably mounted with respect to the element 23 by a self-aligning bearing 67 rotatably supporting a terminal member 68 having a radially extending rod 69 integrally secured thereto, which rod is slidably positioned in a guideway 70 in the fitting 66 and is formed with a head 71 at its outer end for limiting the movement of the fitting 66 with respect to the element 23.

The other end of the strut 25 (FIGS. 11, 12) has a self-aligning terminal 72 which is linked to lugs 73 on the casing 22 by a pin 74. The other end of the strut 24 is coupled to the casing 22 by a connection 75, about to be described, which enables the casing 22 to be rotated in either direction for a distance equivalent to about one-half of a tooth of the serrated rings 20 and 30.

As shown in FIGS. 11 to 14, the connection 75 comprises a fitting 76 secured to the casing at right angles thereto and approximately opposite the lugs 73 and having a slot 77 therein intermediate the top and bottom thereof and an elongated aperture 78 transversely to and extending through the slot 77 (FIG. 14); a slide 79 in the slot 77 having a pair of longitudinally spaced apertures 80 and 80' either of which is adapted to register with the aperture 78; a fork 81 for receiving the fitting 76 between its prongs and being pivotally connected to the strut 24; a bolt 82 for connecting the slide 79 to the prongs of the fork 81; and a lock including a rotatable handle 83 pivotally mounted at the upper portion of the fitting 76, and a pin 84 loosely depending from one end of the handle 83 and having a free end slidable in the aperture 78, whereby the pin 84 can extend through either of the apertures 80 or 80' to lock the slide 79 with respect to the fitting 76.

Figures 13, 14:
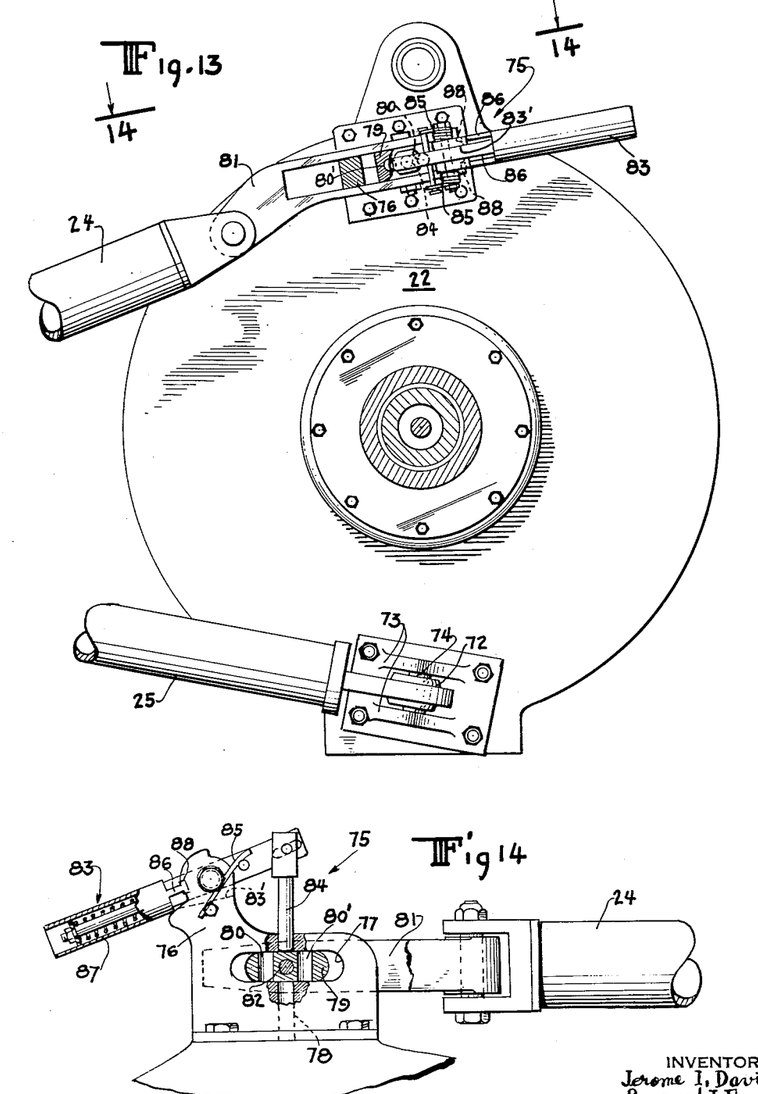
FIG. 13 is a sectional view taken along the line 13—13 on FIG. 4 illustrating the locking means for the coupling arrangement.
FIG. 14 is a sectional view taken along the line 14—14 on FIG. 13.
Figure 15:
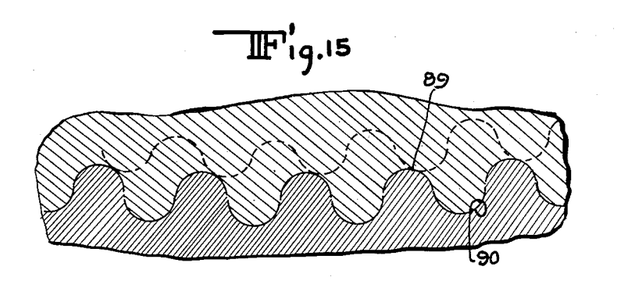
FIG. 15 is an enlarged fragmentary sectional view illustrating the manner in which the wheel mover ring and the aircraft wheel ring may be initially placed into driving connection.

Preferably, the handle 83 is pivotally mounted in a slot 83' at the upper portion of the fitting 76 and is urged by a spring 85 to move the pin 84 into a locking position and is held with the pin 84 in a non-locking position by a detent 86 on a retractable grip 87 on the handle 83 adapted to enter a recess 88 on the fitting 76 (FIG. 14).

*Attachment of the wheel mover*

The wheel mover WM is attached to the wheels of the aircraft in the manner shown in FIG. 3 by first securing the element 23 for rotation with the reaction point wheel and then attaching the element 29 in the manner about to be described.

Figure 12:
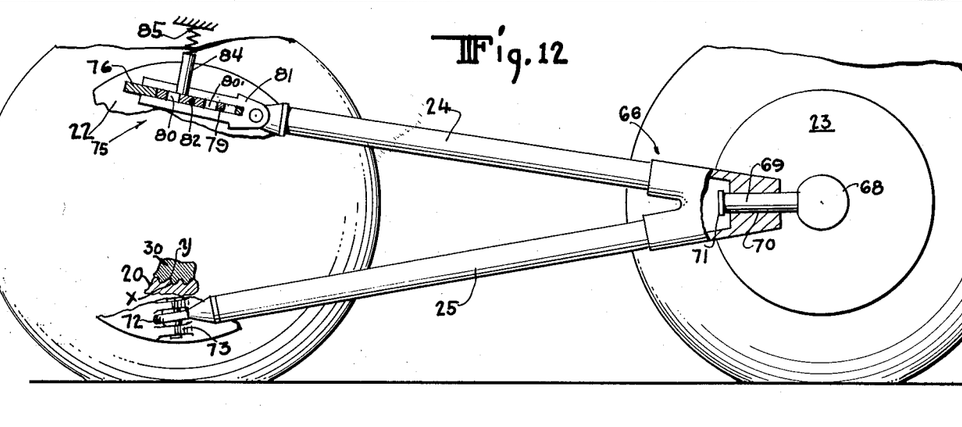

In order to accomplish the latter, the handle 48 (FIG. 3) is placed in the Neutral (N) position and the handle 83 is placed in the detent position with pin 84 in the raised position shown in FIG. 14. The ring 30 is then placed adjacent to ring 20 with their centers of rotation in substantial alignment. In the event the aircraft wheel is positioned so that the teeth X and Y of rings 20 and 30, respectively, are out of mesh (FIG. 11), the casing 22 is turned either clockwise or counter-clockwise to move the ring 30 carried by the element 29 a sufficient distance to put the teeth X and Y of rings 20 and 30, respectively, in mesh (FIG. 12). As this movement of the casing 22 occurs, the fitting 76 which is rigidly secured to casing 22 also moves therewith and the slide 79 assumes the position shown in FIG. 14 with the apertures 80 and 80' flanking the aperture 78.

With the teeth of the respective rings 20 and 30 in mesh, the handle 48 is next placed in the Close (C) position, as explained hereinbefore, the C-clamp members 43 are locked in position through the locking member 62. The grip 87 of the handle 83 is then pulled backwardly, to the left as viewed in FIG. 14, so as to disengage the detents 86 (two prongs) of the grip 87 from the recesses 88 provided in the fitting 76. Upon such disengagement the grip is then rotated 90°, whereby the detents 86 are freely movable within the slot 83' provided in the upper portion of the fitting 76. The pin 84 is thus biased downwardly by spring 85 against the upper surface of the slide 79. With the wheel mover WM thus locked in position, application of torque by the driving ring 30 to the aircraft ring 20 causes the slide 79 to be moved to its limit, either to the right or left, in the slot 77. One of the apertures 80 or 80' registers with aperture 78 and the pin 84 passes through the aligned apertures to completely lock the torque reaction system in place.

*The wheel and wheel mover gears*

In order to facilitate meshing of the gear 30 with the gear 20, the teeth of gear 20 diverge and the teeth of the gear 30 converge at corresponding angles (FIG. 4), and the teeth are formed with rounded crowns 89 and recesses 90 (FIG. 15) which by reason of their tapers enables them to cam into mesh.

*The vehicle*

The vehicle, as shown in FIGS. 16 and 17, has four main wheels 91 two of which are powered by a hydraulic motor to propel the vehicle at speeds up to 20 miles per hour, and has three retractable, dual wheeled casters 92, one at the middle front and two at the rear, which casters are lowered when the vehicle is attached to the main landing gear of the aircraft, for example, by a draw bar 94 to thereby raise the main wheels 91 off the ground and enable the vehicle to satellite the aircraft. A steering system, including a steering wheel 93, is provided to render the vehicle maneuverable when on its main wheels 91.

The vehicle V has the power plant P mounted thereon which includes an internal combustion engine serving as the prime mover and one or more hydraulic pumps to which the fluid lines L are connected in the manner described hereinafter. As seen in FIG. 16, the right and left wheels of the aircraft are spaced apart a considerable distance and the vehicle is coupled to the landing gear structure supporting the right wheels with the fluid lines for powering the wheel mover unit connected to these wheels having their fluid lines extending directly forwardly from the front of the vehicle. The fluid lines for powering the wheel mover unit connected to the left wheels extend diagonally to span the space between the left and right wheels.

Support is provided for these diagonal fluid lines by a drain line 95 which is secured to a vertical member 96 on the vehicle at one side thereof and to a manifold 97 adjacent the wheel mover WM. Preferably, the diagonal fluid lines are coupled to a manifold 97' which is mounted to swing horizontally about the vertical member 96, so that the diagonal fluid lines can be folded against the side of the vehicle when the wheel mover units are not in use. It might be mentioned at this point that the fluid lines L are connected to the hydraulic motors by quick disconnect hydraulic couplings.

As shown in FIGS. 16 and 17, the oppositely facing or inner sides of the aircraft wheels are provided with the rings 20 and 21, so that the ground crew can work between the wheels and can directly go from one side to the other when attaching or removing the wheel mover units.

It will be understood that the vehicle also is provided with a suitable storage space or racks for carrying the wheel mover units when not in use, so that the units can be stored compactly and are readily accessible for use.

The weight of the vehicle including the power plant, the wheel movers and all other equipment thereon is about five tons. The vehicle is about seventeen feet long and six feet wide, and has a height of about fifty-six inches, so that it fits under the wings of the aircraft, which wings are a much greater distance from the ground, the wheels alone having a diameter of forty-three inches, so that the clearance under the wings at the landing gear is about seven feet.

*The hydraulic power plant*

Figure 18:
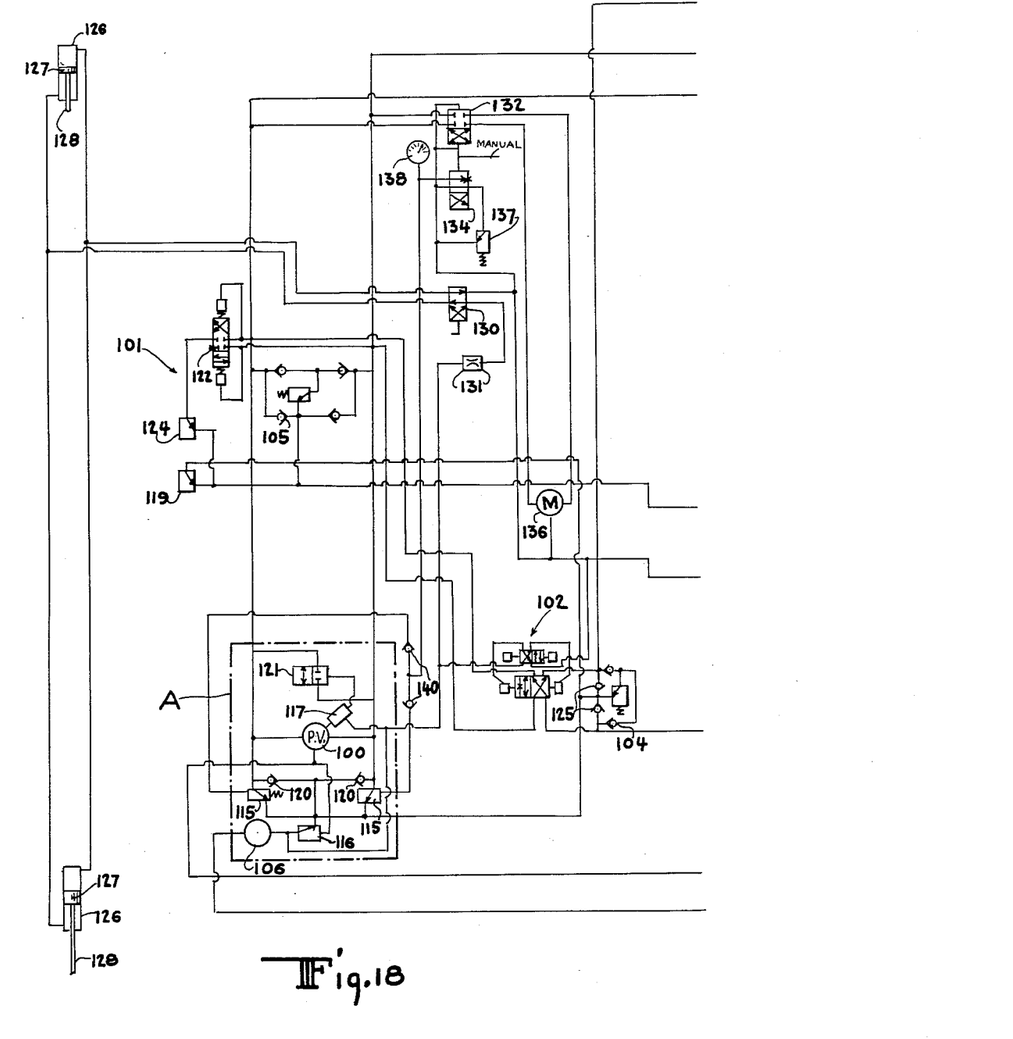
FIGS. 18 and 18a are schematic views of the hydraulic system.
Figure 18A:
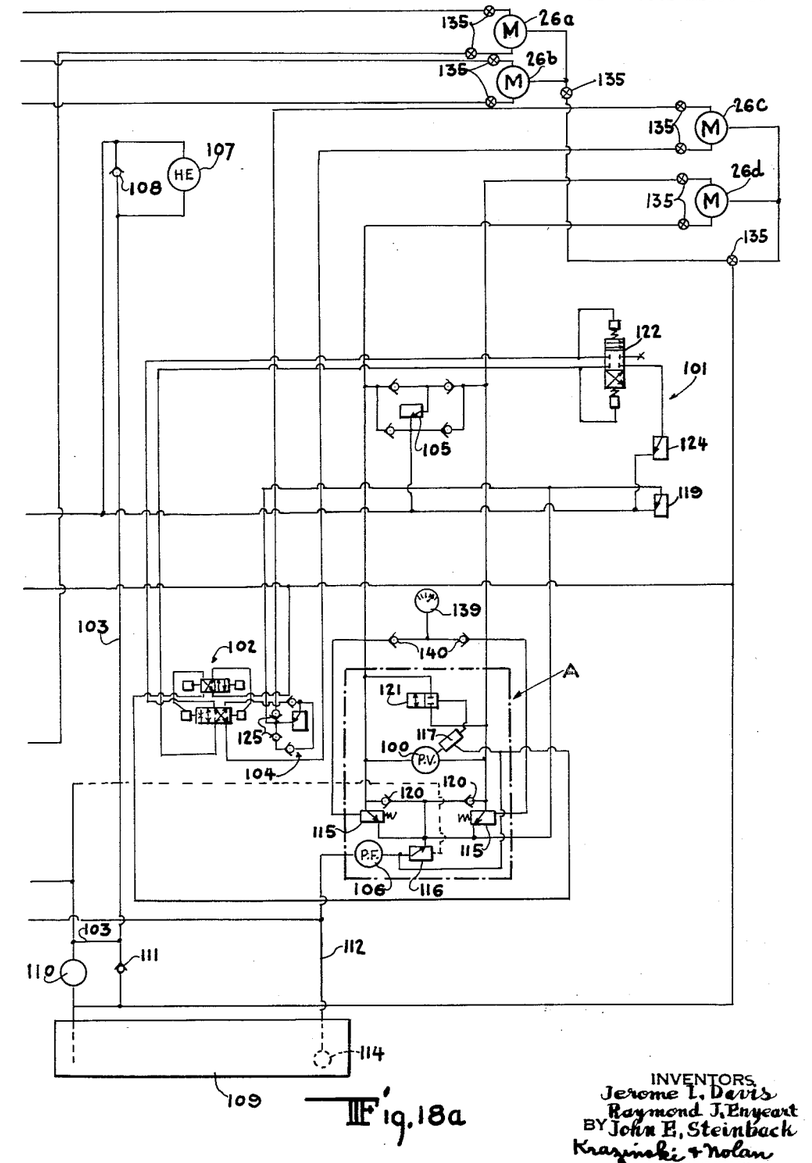

The hydraulic system is diagrammatically illustrated in FIGS. 18 and 18a and, in addition to an engine and hydraulic pumps for powering the vehicle, the wheel mover units and the aircraft, includes an electric generator and an air compressor and/or a high pressure air storage receptacle for respectively supplying electrical and pneumatic power to the aircraft when its main power plant is idle. These latter expedients obviate the necessity for the aircraft to carry an auxiliary power plant for operating electrical and pneumatic equipment on board. The elimination of the cost and weight of such an auxiliary system more than compensates for the slight modification of the aircraft main landing gear wheels to accommodate the wheel movers.

Generally described, the hydraulic system comprises two independently closed hydraulic loops each having two motors 26 connected therein, the motors in these views being designated 26a, 26b, 26c and 26d, with motors 26a and 26b and motors 26c and 26d being in the same loop, respectively. Each loop includes a primary axial piston type, variable displacement, reversible hydraulic pump 100 for driving the motors, a hot oil removal system 101, valving 102 for cutting out one of the motors in the loop, valving 104 and 105 to minimize shock while shifting from two motors to one or vice versa, and a supercharging pump 106.

Common to both loops is a heat exchanger 107 protected by a by-pass check valve 108, an oil reservoir 109, a return line 103 connecting the outlet of the heat exchanger 107 to the reservoir 109, a filter 110 in the return line 103 protected by a by-pass check valve 111, an oil supply line 112 connecting the reservoir to the supercharging pumps 106, and a strainer 114 in the supply line at the reservoir 109.

The primary pumps 100 have built-in pressure relief valve 115 and the supercharging pumps 106 have relief valves 116 for controlling the maximum pressure. The pressure of each supercharging pump 106 is used to supply a servo 117 which controls the primary pump displacement. Oil by-passed by the valve 116 is pressure controlled by a relief valve 119 which has its inlet connected to the valving 104 and 116 and having its outlet connected to the valving 105 and the heat exchanger 107. This by-passed oil is used for replenishing oil lost in the closed loop due to case drains, etc., and enters the low pressure side of the primary pump 100 through check valves 120. Another component of the primary pumps is a "dead band" control, which by-passes all pumped fluid to the return side of the pump when the flow is one gallon per minute or less. This function is performed by a two-way valve 121 having its spool position dictated by flow rate.

The hot oil removal system 101 includes a pilot operated four-way valve 122 which senses differential pressure between the two sides of the loop automatically, thus opening the return side of the loop to the reservoir 109 through a relief valve 124. This relief valve controls the pressure in the return side of the loop when oil is being removed from the system and is set somewhat lower than the valve 119, whereby the valve 119 controls supercharge pressure only when pressures on both sides of the loop are within 50 p.s.i. of each other.

A high speed arrangement is accomplished by cutting out one of the motors 26 in each loop, namely 26a and 26c, through the valve 102 which is pilot operated. This valve 102 is shown in the low speed range, that is, with both motors in each loop being driven. When the spool is shifted, each of the motors 26a and 26c becomes part of its own independent closed loop and then acts as a pump, since it is geared to run with its mate which is still being driven by the pump 100, namely, 26b and 26d, respectively. Flow through the cut-out motors 26a and 26c can become rather high, thereby making it necessary to supercharge the respective loops with oil. The relief valve 119 controls the replenishing of oil and oil is admitted to the respective loops through check valves 125.

The hydraulic system also powers the mechanism for lowering or extending the casters 92 to raise the vehicle main wheels off the ground when the vehicle is satellited to the aircraft, which mechanism includes cylinders 126, pistons 127 and piston rods 128. The piston rod is connected to the caster retraction linkage (not shown). Fluid for this system is supplied by one of the supercharging pumps 106 and its pressure is controlled by the relief valve 116. A manually operable four-way valve 130 controls the direction of flow to the cylinders 126. An adjustable needle valve 131 is provided in this line to avoid starvation to the servos 117 while the pistons are moving under little or no resistance.

A difference between the two primary loops is that a vehicle drive circuit is in one of the loops. A manual four-way valve 132, shown in aircraft drive position, is linked mechanically to a second four-way valve 134. These valves are shifted to vehicle drive when the wheel movers are not connected to the aircraft and the ends of the loops are blocked by a shut-off feature embodied in conventional quick disconnect couplings 135. When these couplings 135 are disconnected, the only path for the loop to take is through the valve 132 to a hydraulic motor 136 which drives the vehicle.

The motor 136 is a fixed displacement vane type motor operable at pressures up to 2000 p.s.i., whereas the main hydraulic system relief valves are set at about 3000 p.s.i. It thus is necessary to reduce the system pressure in vehicle drive to the 2000 p.s.i. maximum. This reduction is accomplished by valve 134 admitting oil to remote control valve 137, since valve 134, as aforementioned, is linked to the vehicle aircraft valve 132.

Pressure gauges 138 and 139 in conjunction with check valves 140 to insure that pressure is sensed only on the high pressure side of the hydraulic system.

*Electrical controls*

The flow of fluid from the two hydraulic pumps 100 (FIGS. 18, 18a) to the four hydraulic drive motors 26, two motors on each drive assembly, is controlled by two electric actuators 150 and 151 (FIG. 19), one for each pump, which actuators are supplied by electrical energy from the vehicle generator (not shown). Each pump actuator comprises a direct current motor (not shown), with two fields, one field for each direction of fluid movement. Each actuator is controlled independently of the other by a conventional Wheatstone bridge circuit with a polarized relay as a null-seeking device.

There are two positioning potentiometers 152, 153 for aircraft drive, which potentiometers are located in the remote control box 142 (FIG. 16) and each potentiometer is operated independently of the other by a control lever (not shown) with spring return to "off" or "neutral" position. The control levers in box 142 are normally in "neutral" position, being spring biased into a detent formation (not shown). There are also two follow-up potentiometers 154, 155 which are mechanically linked to their associated actuators. The potentiometers and resistors are each of such value that the movement of each associated lever is of equal travel for first speed, second speed and reverse.

In the "neutral" and "max first speed" positions, detents (not shown) are provided. By moving the levers into the "second speed" range switches are operated for deenergizing a solenoid valve that interrupts the flow of hydraulic fluid to one of the two hydraulic motors on each aircraft wheel and changes the tuning of the Wheatstone bridge circuit in such manner that the actuators reduce the flow of hydraulic fluid to the remaining motors in half.

For vehicle drive the positioning circuit for the left pump in the remote control box 142 is replaced by a reversible circuit with a potentiometer located in the cockpit of the vehicle and operated by an accelerator pedal. The reversing switch is located on the vehicle dashboard and is electrically interlocked, so that the direction of movement of the vehicle cannot be changed with the accelerator pedal depressed.

The electrical circuit (FIG. 19) will be most readily understood from a detailed description of its operation, first for movement of the aircraft under control of the vehicle, and then for movement of the vehicle by itself. Assume that the wheel mover is connected to the aircraft wheels in the manner described hereinbefore, and it is desired to move the aircraft full straight ahead, that is, in a forward direction.

Figure 19:
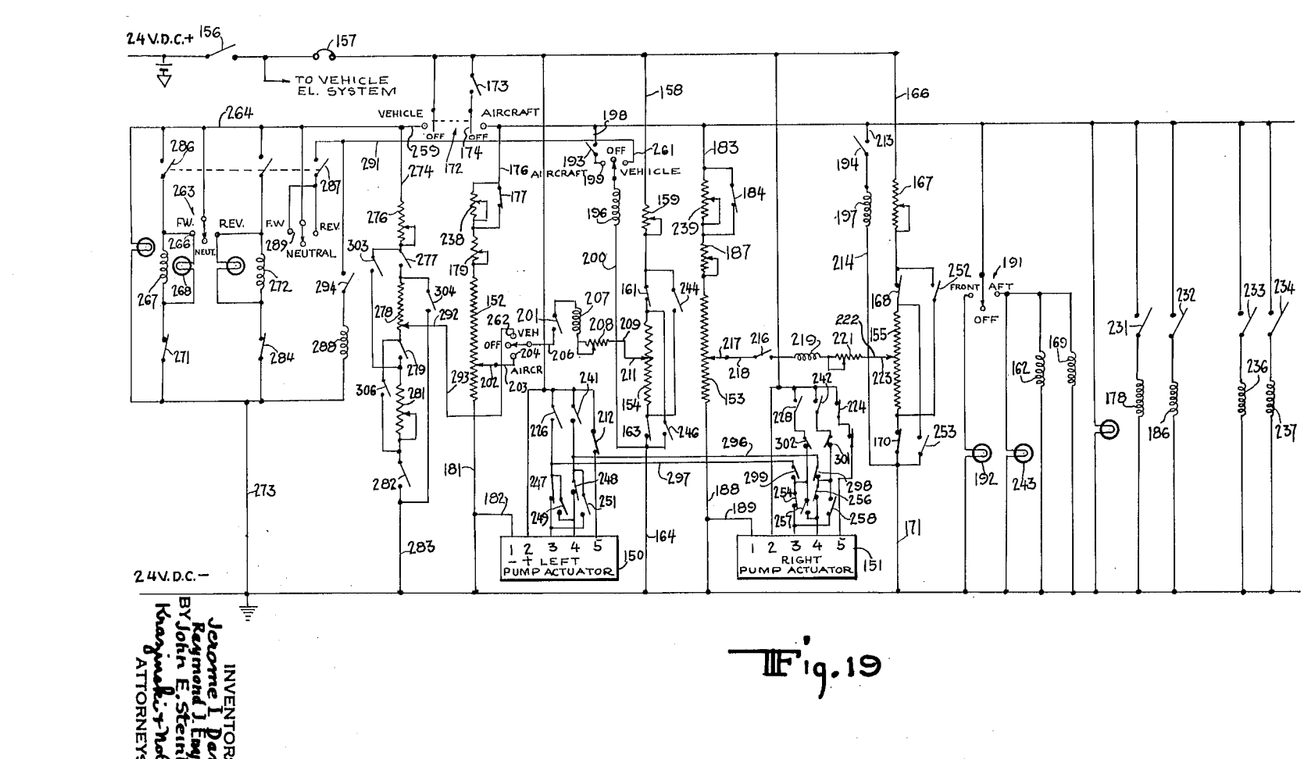
FIG. 19 is a schematic view of the electrical control circuit.

Main line or ignition switch 156 is first closed to energize both follow-up potentiometers 154, 155 and to place positive potential on each of the terminals 2 and 5 of the two pump actuators 150 and 151. The circuit for the left follow-up potentiometer 154 may be traced from a source of power developed by the vehicle generator, shown illustratively as a positive pole of a 24 volt direct current battery supply, through closed ignition switch 156, circuit breaker 157, lead 158, rheostat 159, normally closed contact 161 of left pump actuator reversing relay 162, and thence through follow-up potentiometer 154 and normally closed contact 163 of relay 162 to the grounded or negative side of the battery source via lead 164. Similarly, the circuit for the right follow-up potentiometer 155, which is in parallel with the left follow-up potentiometer 154, may be traced across the power source via lead 166, rheostat 167, normally closed contact 168 of right pump actuator reversing relay 169, right follow-up potentiometer 155, normally closed contact 170 of reversing relay 169 and lead 171.

Switch 172, which is a gang type switch with a plurality of mechanically interconnected switch arms (connections shown dotted) is next thrown to the "aircraft" position from its "off" position. As a safety precaution, a retraction gear switch 173 interrupts the power supply to the entire aircraft control circuit during the time the vehicle is resting on its wheels to thus prevent movement of the aircraft until the vehicle wheels are raised above the ground and the vehicle supported upon its casters 92. Accordingly, gang switch 172 is linked to a hydraulic valve control lever (not shown) in such a way that aircraft movement can be accomplished by the wheel mover WM only when the vehicle V is on its casters 92. Obviously, the vehicle V can be propelled only when it is resting on its wheels 91 with its casters 92 raised.

Thus assuming that the vehicle V is now resting on its casters 92 with switch 173 closed, an energizing circuit for each of the positioning potentiometers 152 and 153 is provided. Both of these circuits are in parallel and positive potential can be traced from closed switch 173, through closed contact 174 of gang switch 172, lead 176, normally closed contact 177 of left wheel second speed relay 178, rheostat 179, and thence through left positioning potentiometer 152 to ground via lead 181, terminal 1 of the left pump actuator 150 being connected to lead 181 and ground by lead 182. In like manner, the circuit for the right positioning potentiometer 153 may be traced over lead 183, through normally closed contact 184 of right wheel second speed relay 186, rheostat 187, and thence through right positioning potentiometer 153 to ground via lead 188, terminal 1 of the right pump actuator being connected to lead 188 and ground by lead 189.

Aircraft landing gear switch 191 is thrown to "front" position, since the wheel mover is attached to the front landing wheels of the aircraft, and closure thereof energizes signal lamp 192 in an obvious circuit.

Both Wheatstone bridge circuits, as traced hereinbefore, are balanced. It might be mentioned at this point that the Wheatstone bridge circuits shown are conventional and well known for the control purposes used herein. It is, therefore, not deemed necessary to go further into detail thereon.

With the Wheatstone bridge control circuits in a balanced state and the control levers in box 142 in "neutral" position, both control levers are gradually moved out of their detent positions to close both left and right wheel stop switches, respectively, and thereby energize corresponding left and right stop relays 196 and 197. The energizing circuit for the left stop relay 196 may be traced from battery through retraction gear switch 173, contact 174 of gang switch 172, lead 198, stop switch 193, contact 199 of now closed gang switch 172, and thence through winding of relay 196, leads 200 and 164 to ground. Relay 196 in operating closes its make contact 201, which in turn closes the left null circuit which can be readily traced from left positioning potentiometer 152 through potentiometer slider arm 202, lead 203, contact 204 of closed gang switch 172, lead 206, closed relay contact 201, winding of polarized relay 207, resistor 208, lead 209, and through potentiometer slider arm 211 to left follow-up potentiometer 154. Relay 196 in operating also opens its break contact 212 to keep the left actuator out of its center or zero position.

Similarly, the energizing circuit for the right stop relay 197 may be traced from battery supply over lead 213, closed stop switch 194, winding of relay 197, lead 214 and thence over lead 171 to ground. Relay 197 in operating closes its make contact 216 which in turn closes the right null circuit that can be traced from right positioning potentiometer 153, through potentiometer slider arm 217, lead 218, closed make contact 216, winding of polarized relay 219, resistor 221, lead 222 and thence through potentiometer slider arm 223 to right follow-up potentiometer 155. Relay 197 in operating also opens its break contact 224 to keep the right actuator out of its center or neutral position.

Further movement of both speed control levers brings the latter up to the first or low position which is also detented. During this movement of the control levers both left and right potentiometer slider arms 202 and 217, respectively, move upwardly, as viewed in FIG. 19, to detune or unbalance the Wheatstone bridge circuit and cause current to flow through the respective polarized relays 207 and 219 of the null circuits. Relay 207 in operating closes its make contact 226 to place positive battery potential on terminal 3 of the left pump actuator 150 while relay 219 in operating closes its contact 228 to place positive battery potential on terminal 3 of the right pump actuator 151. Both actuators 150, 151 now move out of their zero positions and actuate their respective pump levers to provide flow of hydraulic fluid through their respective motors 26a, 26b, 26c and 26d which rotate the wheel movers and, in turn, the wheels of the aircraft at a predetermined speed.

Meanwhile, both actuators 150, 151 move their respective slider arms 211 and 223 of the follow-up potentiometers 154 and 155, respectively, upwardly as viewed in FIG. 19, the pump levers and associated slider arms being mechanically interconnected, to balance the respective Wheatstone bridge circuits.

Both speed control levers are next gradually moved from their first to their second positions, to increase the speed, and, as these control levers move out of their detents, corresponding left and right aircraft wheel second speed switches 231 and 232 close to energize their respective second speed relays 178 and 186 in obvious circuits. Relays 178 and 186 in operating respectively open break contacts 177 and 184 and close make contacts 233 and 234, the latter two closures energizing left and right wheel second speed solenoid valves 236 and 237, respectively, in obvious circuits. Break contacts 177 and 184 in opening remove the short circuits across left and right wheel second speed resistors 238 and 239, respectively, of their positioning circuits to oppositely detune their respective Wheatstone bridge circuits and produce reverse currents through their respective polarized relays 207 and 219. Relay 207 being operatively poled in a reverse direction opens contact 226 and closes contact 241 to transfer battery potential from terminal 3 to terminal 4 of the left pump actuator 150. Similarly relay 219 opens contact 228 and closes contact 242 to transfer battery potential from terminal 3 to terminal 4 of the right pump actuator 151. Both pump actuators 150, 151 reverse the direction of movement of their respective slider arms 211 and 223, which now move downwardly, as viewed in FIG. 19, to their original midway positions. At this point one of the hydraulic motors of each loop is disconnected from the hydraulic circuit, but since the same amount of hydraulic fluid is flowing through each of the two remaining motors, the speed of the wheel mover remains the same.

Further movement of the speed control levers to their final detent positions at second speed resumes upward movement as viewed in FIG. 19, of the left and right positioning potentiometer slider arms 202 and 217 to again detune or unbalance their associated Wheatstone bridge circuits, potentiometers 152 and 153 being substantially short circuited at this time. The current flow through each of the polarized relays 207 and 219 of the null circuit is reversed again to its original direction to release contacts 241 and 242 and reclose contacts 226 and 228 and thereby transfer battery potential from terminals 4 to terminals 3 of the pump actuators 150 and 151, respectively. The pump actuator slider arms 211 and 223 are again moved upwardly to rebalance their respective Wheatstone bridge circuits. At this point both pump actuators double their previous flow of hydraulic fluid through each of the two hydraulic motors to thus drive the wheel movers at full speed forward.

To stop the forward movement of the aircraft it is merely necessary to return both speed control levers to their initial central positions, whereupon second speed relays 178 and 186 and associated solenoid valves 236 and 237 release, left and right stop relays 196 and 197, respectively, release to reopen their respective contacts 201 and 216 to de-energize their associated null circuits and to reclose their respective contacts 212 and 224 to place positive battery potential on terminals 5 of their associated pump actuators 150, 151. Since both null circuits are now open, relays 207 and 219 release to open their associated contacts 226 and 228 and thereby remove potential from terminals 3 of the pump actuators 150, 151. As battery potential is now present on terminals 5 of the pump actuators, this causes the follow-up slider arms 211 and 223 to return downwardly to their original center positions.

To reverse the direction of the aircraft the two speed control levers are moved backward from their neutral positions toward the operator. In this direction there is only one speed available, as is conventional. Stop relays 196 and 197 operate as heretofore and current flow through polarized relays 207 and 219 of the null circuits is in such direction as to close contacts 241 and 242 and place positive battery potential on terminals 4 of the respective pump actuators 150 and 151. Both slider arms 202 and 217 having moved downwardly in response to the speed control levers, the actuator slider arms 211 and 223 are also moved downwardly, until the Wheatstone bridge circuits are balanced, by the respective pump actuators 150 and 151 which also direct the hydraulic fluid in a reverse direction to similarly reverse rotation of the hydraulic motors and, in turn, the aircraft.

For steering the aircraft on turns the speed control levers are moved independently of each other, therefore causing different speeds of the two landing wheels up to a point where one landing wheel can be propelled in an opposite direction to the other and thus cause a sharp turn on the spot.

Provision is made in this invention for attaching the wheel mover unit to either the front or the rear (aft) landing wheels. In the foregoing description the wheel mover was attached to the front landing wheels. With insufficient space at the front of the aircraft it is necessary to attach the wheel mover to the rear landing wheels of the aircraft. Consequently, switch 191 is thrown to the "aft" position to energize lamp 243 and reversing relays 162 and 169 in obvious circuits, all three components being in parallel.

In operating, left pump actuator relay 162 reverses the flow of current through its associated follow-up potentiometer 154 by opening its two break contacts 161 and 163 and closing its two make contacts 244 and 246, and also reverses the terminal connections 3 and 4 at the left pump actuator 150 by opening its break contacts 247 and 248 and by closing its make contacts 249 and 251. Similarly, right pump actuator relay 163 in operating reverses current flow through follow-up potentiometer 155 by opening its two break contacts 168 and 170 and closing its two make contacts 252 and 253; and also reverses the terminal connections 3 and 4 at the right pump actuator 151 by opening its break contacts 254 and 256 and by closing its make contacts 257 and 258. With these reversals of current flow at the follow-up potentiometers and reversals of terminal connections 3 and 4 at the pump actuators the wheel mover operating procedure is as described hereinbefore for the condition with the wheel movers mounted on the front landing wheels.

The electrical circuit will now be described in connection with movement of the vehicle by itself. The wheels 91 of the vehicle are lowered and the casters 92 raised, so that the vehicle is resting on its wheels. As before, ignition switch 156 is closed to energize both follow-up potentiometers 154 and 155 and to place positive battery potential on terminals 2 and 5 of the two pump actuators 150 and 151. Gang switch 172 is then thrown to the "Vehicle" position whereupon mechanically connected contacts 259, 261 and 262 are closed, switch contact 259 supplying positive battery potential to gang switch 263 over lead 264. Gang switch 263 has two arms movable as a unit and, assuming the vehicle is to be driven in a forward direction, switch 263 is thrown to the FW position to engage contact 266. An energizing circuit for relay 267 and lamp 268 occurs which circuit can be traced from positive battery through closed switch 156, circuit breaker 157, closed contact 259 of gang switch 172, lead 264, contact 266, winding of forward drive relay 267 and lamp 268 in parallel, and thence through break contact 271 of vehicle reverse drive relay 272 and lead 273 to ground.

Relay 267 operates and closes a circuit for the vehicle drive positioning potentiometer which circuit can be traced via switch contact 259, lead 274, adjusting rheostat 276, closed make contact 277 of relay 267, positioning potentiometer 278, closed make contact 279 of relay 267, adjusting rheostat 281, closed make contact 282 of relay 267, and thence over lead 283 to ground. Relay 267 also opens its break contact 284 and thereby prevents operation of the vehicle reverse drive relay 272. The vehicle forward drive relay 267 is locked in its operating condition by accelerator pedal stop switch 286, which is also a gang type switch with its arms tied together and movable as a unit. Switch 286 is closed when the accelerator pedal is depressed and is opened when the accelerator pedal is released. Upon closure of switch 286 contact 287 closes an operating circuit for left wheel stop relay 196 over switch contact 259, lead 264, closed contact 289 of gang switch 263, closed contact 287, lead 291, contact 261, and thence through winding of relay 196, leads 200 and 164 to ground. Operation of stop relay 196 closes the null circuit which can be traced from positioning potentiometer 278 over slider arm 292, lead 293, switch contact 262, lead 206, closed make contact 201 of relay 196, polarized relay 207, resistor 208, lead 209 and thence over slider arm 211 to left follow-up potentiometer 154. Relay 196 also opens its break contact 212 to keep the left pump actuator 150 out of its center or zero position. The Wheatstone bridge circuit is balanced.

As the accelerator pedal is depressed, the glider arm 292 of this positioning potentiometer 278 moves upwardly, as viewed in FIG. 19, to its final uppermost position when the accelerator pedal is fully depressed. The Wheatstone bridge circuit is accordingly unbalanced, as described hereinbefore in connection with aircraft drive, and causes forward movement of the vehicle through operation of the left pump actuator.

For doubling the vehicle driving speed switch 294 is closed, whereby relay 288 is energized in a simple circuit via closed switch 287. Relay 288 in operating places the left and right pump actuators 150 and 151 in parallel operation over leads 296 and 297 and its closed make contacts 298 and 299. Relay 288 also opens its break contacts 301 and 302 to assure parallel control of the two actuators. The outputs of both hydraulic pumps are thus provided for driving the vehicle at the desired increased speed.

For reverse drive of the vehicle, the gang switch 263 is moved to the REV position and the accelerator pedal is released to permit gang switch 286 to open. Relay 272 then operates in an obvious circuit to cause current flow through the positioning potentiometer 278 in an opposite direction by closure of its contacts 303, 304 and 306, so that the current now flows up rather than down, as heretofore described for forward drive, also with reversed positions for the resistors 276 and 281 in the positioning potentiometer circuit. Relay 272 also prevents operation of forward drive relay 267 by opening its break contact 271. The accelerator pedal is then depressed to close gang switch 286 and in turn operate relay 196 and, when the accelerator pedal is depressed to its full position, the slider arm 292 moves up to its uppermost position to cause the left pump actuator 150 to operate in a reverse direction, as described hereinbefore for aircraft drive.

*Operation*

In operation, the vehicle engine is started as the aircraft is landing on the runway, after which the vehicle V meets the aircraft during its approach to the terminal or station. For ground movement of the vehicle, the engine effects operation of the electric and pneumatic power sources, to service the requirements of the aircraft.

When the aircraft engines have been shut down and the aircraft has come to rest, the vehicle is brought into position, as shown in FIGS. 2 and 16, preferably in back of and to one side of the main landing gear. The electrical, hydraulic and pneumatic power lines, as well as the control lines, are connected to the aircraft by quick make and break couplings, so that at the outset the pilot has control of the vehicle V. Alternatively, the control lines may be coupled to a control box 142 (FIG. 16) which is carried by a ground walker (not shown) who may have a better view of the ground operations taking place than the pilot in the nose of the aircraft. A loud speaker or earphone radio system (not shown) is provided for two-way communication between the persons in charge of the ground and the aircraft operations.

The vehicle is coupled to the landing gear structure, and the wheel mover units are attached by the ground crew in the manner already described, either one at a time or simultaneously depending on the number of persons in the ground crew.

While the wheel movers are being attached to the aircraft wheels, the fluid lines L for supplying hydraulic power to the motors 26 are connected. The quick make and break couplings 135 are provided for this purpose. Each of these couplings has an automatic shut-off valve in its portion connected to the free end of the fluid line, so that this valve is opened when the coupling parts are properly connected. After the fluid lines have been connected, the hydraulic pumps are put into operation.

The aircraft can now be moved into the parking or maneuvering area by the ground mover units. Initial movement of the aircraft is effected preferably by powering both of the motors 26 of each wheel mover unit. One motor can be cut out as the aircraft gains momentum. Turning of the aircraft is effected by running one wheel mover forward and the other in reverse to maneuver the aircraft in a manner similar to that in which twin propeller ships are handled. Also the turning may be accomplished, during forward or rear movement, by increasing the speed of the wheels on one side of the aircraft and decreasing the speed of the wheels on the other side of the aircraft. Braking can be effected by reducing hydraulic flow to the wheel mover motors. More torque can be applied for starting and inching the aircraft on an incline by cutting in the second motor, at a sacrifice in speed. One motor is used when the aircraft is to be moved at a higher speed.

When the aircraft has been brought to the station and placed in unloading position, the vehicle with its wheel movers may remain attached thereto and serve as a standby power plant and thus be available for moving the aircraft into its hanger or to a parking area, as described. However, should the vehicle be required to move a second aircraft at the airport, the power and control lines are uncoupled, the wheel movers are detached from the aircraft wheels, and power lines at the station are coupled to the aircraft until the aircraft is to be moved again by the vehicle wheel movers.

In order to move the aircraft onto the field or elsewhere, the vehicle and the wheel movers are again attached in the manner already described. In preparation for take-off, the aircraft is brought onto the airfield and at least one of its engines is started by the stored high pressure air in a receptacle on the vehicle. This eliminates the need of a high pressure air engine starter system on the aircraft, and enables at least one engine to supply power for the main power plant of the aircraft, whereby the other engines can be then started.

The foregoing operation is a new concept in the ground handling of heavy aircraft and gives rise to the many advantages mentioned throughout this application.

Conclusion

From the foregoing description, it will be seen that the present invention provides a unit which is self propelled, is highly maneuverable, has a low silhouette to reduce the possibility of collision damage to the aircraft, is capable of handling aircraft more than thirty times its weight, has wheel mover units which can be handled by two men and are readily attached and removed, has a ground speed up to twenty miles an hour and is capable of propelling the aircraft at a speed of better than five miles an hour; can move the aircraft up a 2% incline, has good acceleration, enables the aircraft to be moved on slippery surfaces, supplies electric, hydraulic and pneumatic power, can serve as a power plant for the aircraft when parked or when brought onto the field in preparation for take-off, and is readily controlled from the flight panel or the ground by the operator. All this is accomplished by a prime mover having an output of 200 horsepower.

While the system and its components have been described in connection with supplying power to jet engine propelled aircraft, it will be understood that in principle it can be applied for moving other types of wheeled craft where similar problems exist, wherefore the system has general application.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. In combination, aircraft having a pair of aligned landing wheels each having a ring and one of said rings having means for driving the same; wheel mover means including a pair of casings, an arm interconnecting said casings, and rotatable coupling means carried by each of said casings adapted to be detachably secured to said wheel rings; and motor means carried by one of said casings having driven means constructed and arranged to be placed in driven connection with said wheel driving means.

2. Structure according to claim 1, wherein said wheel driving means is a ring having radially inwardly facing teeth, and said motor driven means is a ring having radially outwardly facing teeth adapted to mesh with said wheel ring teeth.

3. Structure according to claim 2, including means associated with said driving means ring for adjusting the same circumferentially to place the same in meshing relation with its wheel ring.

4. Structure according to claim 1, wherein said arm includes a connection for adjusting the position of said motor means casing with respect to said wheel to facilitate meshing of said rings.

5. In a wheel mover, the combination of a pair of casings each having rotatable means for detachably securing the casings to a pair of aligned aircraft wheels one of which wheels has a ring with teeth thereon, motor means carried by said casing secured to the wheel with the ring including a second ring having teeth thereon adapted to mesh with the teeth of the wheel ring, and a V-shaped arm having one free end pivotally linked at one side of the center of said motor means casing and having an adjustable link at its other free end for connection to said motor means casing at the opposite side of its center and having its end constituting the point of the V slidably linked to said other casing at about its center, whereby said motor means casing is adjustable circumferentially to facilitate meshing of the rings.

6. Structure according to claim 5, wherein said adjustable link comprises a slide having a pair of apertures therein on said arm and a slidably mounted pin on said motor means casing adapted to enter either of said apertures.

7. Structure according to claim 6, wherein said apertures are spaced apart a distance to enable said motor means casing to be rotated with respect to the wheel at least one tooth.

8. Structure according to claim 6, including releasable locking means for said pin.

9. Structure according to claim 6, including a fitting rigidly secured to said motor means casing, a fork member pivotally linked to said arm for receiving said fitting and said fitting having an aperture in which said pin is slidably mounted, said fitting aperture being adapted to register with either of said slide apertures.

10. Structure according to claim 8, wherein said releasable locking means includes a handle pivotally mounted on said fitting, and wherein said slidable pin is dependent from said handle.

11. In an aircraft wheel mover, the combination of a rotatable casing, an annular member carried by said casing adapted for insertion into an annular member on a wheel providing a shoulder, a plurality of C-clamps pivotally mounted on said annular member of said casing, a shaft rotatably mounted on said casing in alignment with the axis of rotation of the wheel, means on said shaft including connecting means for rocking said clamps to extend over and engage the shoulder of the annular member on the wheel, means at the exterior of said casing for affecting rotation of said shaft, and means for locking said shaft against rotation with respect to said casing.

12. Structure according to claim 11, wherein said last mentioned means include a plate having apertures and a pin on said shaft rotating means adapted to extend into said apertures.

13. In a wheel mover, the combination of a pair of casings each having rotatable means for detachably securing the casings to a pair of aligned aircraft wheels one of which wheels has a ring with teeth thereon, motor means carried by said casing for the wheel with the ring including a ring having teeth thereon adapted to mesh with the wheel ring, a V-shaped arm including a fitting and a pair of struts each having one end secured to said fitting, means for rotatably and slidably mounting said fitting on said casing which does not have the ring, means on said casing with said ring for connecting the free end of one of said struts, and means on said casing with said ring for adjustably connecting the free end of said other strut.

14. In a wheel mover, the combination of a pair of casings each having rotatable means for detachably securing the casings to a pair of aligned wheels, one of said wheels having means for driving the same and the other of said wheels serving as a torque reaction point connection, motor means carried by said casing for the wheel to be driven including drive means adapted to be coupled to the means on the wheel to be driven, a V-shaped arm including a fitting and a pair of struts having one end secured to said fitting, means for rotatably and slidably mounting said fitting on said casing for the torque reaction point wheel, means for connecting the free end of one of said struts to said casing carrying said motor means, and means for adjustably connecting the free end of said other strut to said casing carrying said motor means.

15. In combination, a land vehicle, a power plant carried by said vehicle, aircraft main landing gear including two spaced apart wheels, one of which is nearer to said vehicle than the other, means for coupling said vehicle to said landing gear nearest said vehicle, wheel movers for said wheels, means for coupling said wheel movers to said wheels, a power supply line interconnecting said power plant and said wheel mover for said wheel nearer said vehicle, a power supply line interconnecting said power plant and said wheel mover for said other wheel, and a rigid extension on said vehicle at one side for supporting said last mentioned power supply line, said extension being pivotally mounted at one end on said vehicle for movement about a vertical axis to facilitate folding said extension against the side of said vehicle when not in use.

16. A system for moving aircraft on the ground comprising a ground vehicle having wheels, a power plant carried by said vehicle, aircraft wheel mover means powered by said power plant, motor means for propelling said vehicle powered by said power plant, casters at the underside of said vehicle, means actuated by said power plant for extending said casters to raise said vehicle and its wheels off the ground, and means for coupling said vehicle to aircraft, whereby, when said wheel mover means drive the aircraft and said casters are extended, said vehicle is adapted to satellite the aircraft.

17. A system according to claim 16, wherein means are provided for rendering said motor means ineffective and said wheel mover means effective when said casters are extended.

References Cited in the file of this patent

UNITED STATES PATENTS

| | | |
|---|---|---|
| 2,409,552 | Donnellan | Oct. 15, 1946 |
| 2,751,990 | Finlay | June 26, 1956 |
| 2,869,662 | Koup | Jan. 20, 1959 |